US012359480B2

(12) United States Patent
Dosenbach et al.

(10) Patent No.: US 12,359,480 B2
(45) Date of Patent: Jul. 15, 2025

(54) DIGITAL DOOR

(71) Applicant: The Braun Corporation, Winamac, IN (US)

(72) Inventors: Eric Sajed Dosenbach, Winamac, IN (US); Michael R. Pugh, Winamac, IN (US)

(73) Assignee: The Braun Corporation, Winamac, IN (US)

( * ) Notice: Subject to any disclaimer, the term of this patent is extended or adjusted under 35 U.S.C. 154(b) by 268 days.

(21) Appl. No.: 17/953,198

(22) Filed: Sep. 26, 2022

(65) Prior Publication Data

US 2023/0101291 A1 Mar. 30, 2023

Related U.S. Application Data

(60) Provisional application No. 63/247,841, filed on Sep. 24, 2021.

(51) Int. Cl.
*B60J 5/04* (2006.01)
*E05D 3/12* (2006.01)
(Continued)

(52) U.S. Cl.
CPC ........... *E05D 15/101* (2013.01); *E05D 3/127* (2013.01); *E05F 15/662* (2015.01); *E05F 15/649* (2015.01);
(Continued)

(58) Field of Classification Search
CPC ..... E05F 15/10; E05F 15/1005; E05F 15/649; E05F 15/655; E05F 15/603; E05F 15/63;
(Continued)

(56) References Cited

U.S. PATENT DOCUMENTS 7,896,425 B2 * 3/2011 Elliott .................. E05D 15/101
296/146.12
9,605,466 B2 * 3/2017 Wojdyla ................ B62D 47/00
10,384,519 B1 8/2019 Brown et al.

FOREIGN PATENT DOCUMENTS

DE 102018214183 A1 2/2020
EP 3259423 B1 4/2020
(Continued)

OTHER PUBLICATIONS

International Searching Authority, European Patent Office, International Search Report and Written Opinion for PCT/US2022/044758, dated Dec. 22, 2022, 14 pages.

*Primary Examiner* — Dennis H Pedder
(74) *Attorney, Agent, or Firm* — Daniel Tallitsch; Tyler Schultz

(57) ABSTRACT

An automatic door opening apparatus for a vehicle. Two and three hinge joint embodiments with motors at each hinge joint to control motion of the door opening apparatus relative to the vehicle at that hinge joint. The motors are individually programmable to customize the door opening apparatus and movement to different vehicles. The motors can be in alignment or out-of-alignment with the hinge joints, but in either case the motor controls motion of the hinged components at the associated hinge joint. When a motor is out-of-alignment with the hinge joint it controls, then pulley wheels and belts can be used to connect the motor to the hinge joint. The door opening apparatus can also include a floor track, and a door arm that connects the door to the floor track.

15 Claims, 8 Drawing Sheets

(51) Int. Cl.
*E05D 15/10* (2006.01)
*E05F 15/662* (2015.01)
*E05F 15/649* (2015.01)
*E05F 15/655* (2015.01)

(52) U.S. Cl.
CPC ....... *E05F 15/655* (2015.01); *E05Y 2201/422* (2013.01); *E05Y 2201/43* (2013.01); *E05Y 2201/624* (2013.01); *E05Y 2400/36* (2013.01); *E05Y 2400/41* (2013.01); *E05Y 2900/531* (2013.01)

(58) Field of Classification Search
CPC .. E05D 3/127; E05D 3/06; E05D 3/12; E05D 3/125
USPC .......................................................... 296/155
See application file for complete search history.

(56) References Cited

FOREIGN PATENT DOCUMENTS

| | | | |
|---|---|---|---|
| JP | H05112129 | A | 5/1993 |
| WO | 2021003220 | A1 | 1/2021 |

* cited by examiner

DIGITAL DOOR

CROSS REFERENCE TO RELATED APPLICATIONS

This application claims priority to U.S. Provisional Patent Application Ser. No. 63/247,841, filed on Sep. 24, 2021 and entitled "DIGITAL DOOR," the contents of which is incorporated herein by reference. This application is filed concurrently with International Application Number PCT/US22/44758, riled on Sep. 24, 2022 and entitled "DIGITAL DOOR," the contents of which is incorporated herein by reference.

FIELD OF THE DISCLOSURE

The present disclosure relates to products for facilitating access to vehicles, and more specifically to an automatic door assembly for a vehicle.

BACKGROUND

Mass-produced passenger vehicles are not typically designed to transport passengers with physical limitations, either as a driver or a passenger. However, passenger vehicles can be modified, or retrofitted, to accommodate physically limited passengers. The modification can include removing certain parts or structures within the vehicle and replacing those parts with parts designed to accommodate the physically limited passenger. For example, a van can be retrofitted with a ramp to enable a physically limited person using a wheelchair to enter the vehicle without the assistance of someone else. Some common van modifications, include wheelchair lifts, sliding door enlargement or modification, lowered vehicle floor surfaces, etc. Once inside the van, the physically limited individual is often located in a rear passenger compartment of the van adjacent to or behind the assisted entrance. Most, motorized vehicles modified to include a ramp or lift for transporting physically limited passengers are passenger vans, minivans or buses.

Crossover and sport-utility vehicles (SUVs) have become popular. SUVs are typically built on a light-truck chassis similar to passenger vans, whereas crossover vehicles are typically built on a passenger car chassis. However, crossover and sport-utility vehicles have hinged side doors instead of sliding doors. Thus, the modification of crossover and sport-utility vehicles typically includes modifying the hinged side door to accommodate access by the physically limited individual. The variations of vehicle and side door designs for different models and years of crossover and sport-utility vehicles typically requires a total or significant redesign of the modification for the hinged side door for the different models and years.

It would be desirable to have a plug-and-play modification to convert a hinged side door to a sliding door, where the plug-and-play modification can work on many different models and years of different crossover and sport-utility vehicles with minor modifications.

SUMMARY

An automatic door opening apparatus is disclosed for a vehicle that has a chassis, a door with front and rear ends, and a door frame with forward and rearward edges. The automatic door opening apparatus includes a body bracket, a cross member, a hinge post, a front motor and a rear motor. The body bracket has a front bracket end and a rear bracket end, where the rear bracket end is fixedly attached to the chassis of the vehicle. The cross member has a front member end and a rear member end, where the rear member end is hingedly coupled to the front bracket end of the body bracket at a rear hinge joint, and the front member end is hingedly coupled to the door at a front hinge joint. The hinge post has a lower post end and an upper post end, where the lower post end is fixedly attached to the chassis, and the upper post end is coupled to the rear member end of the cross member and the front bracket end of the body bracket at the rear hinge joint. The front motor controls motion of the front member end of the cross member relative to the door at the front hinge joint. The rear motor controls motion of the rear member end of the cross member relative to the front bracket end of the body bracket and the hinge post at the rear hinge joint. The front motor can be a programmable motor configured to control movement speed and rotation of the front member end of the cross member relative to the door at the front hinge joint. The rear motor can be a programmable motor configured to control movement speed and rotation of the rear member end of the cross member relative to the front bracket end of the body bracket and the hinge post at the rear hinge joint.

The front motor can include a front motor shaft aligned with the front hinge joint, where the front motor is configured to control movement at the front hinge joint through the front motor shaft. The rear motor can include a rear motor shaft aligned with the rear hinge joint, where the rear motor is configured to control movement at the rear hinge joint through the rear motor shaft.

The front motor can include a front motor shaft not aligned with the front hinge joint, where the front motor is configured to control movement at the front hinge joint through the front motor shaft. The rear motor can include a rear motor shaft not aligned with the rear hinge joint, where the rear motor is configured to control movement at the rear hinge joint through the rear motor shaft. The automatic door opening apparatus can also include a front pulley wheel, a front pulley belt, a rear pulley wheel and a rear pulley belt. The front pulley wheel can be fixedly attached to the front member end of the cross member at the front hinge joint, and the front pulley belt can be connected to the front motor shaft and to the front pulley wheel, so that the front motor controls movement of the front member end of the cross member relative to the door at the front hinge joint through the front motor shaft, the front pulley belt and the front pulley wheel. The rear pulley wheel can be fixedly attached to the rear member end of the cross member at the rear hinge joint, and the rear pulley belt can be connected to the rear motor shaft and to the rear pulley wheel, so that the rear motor controls movement of the rear member end of the cross member relative to the front bracket end of the body bracket and the hinge post at the rear hinge joint through the rear motor shaft, the rear pulley belt and the rear pulley wheel.

The front motor and the rear motor can be attached to the cross member. The front motor and the rear motor can be configured to control movement of the door between a closed position where the door fills the door frame, and a fully-open position where the front end of the door is positioned rearward of the rearward edge of the door frame.

The automatic door opening apparatus can also include a floor track and a lower door arm. The floor track can extend from a front path end to a rear path end. The lower door arm can extend from a proximal end to a distal end, where the proximal end is fixedly attached to the door, and the distal end is attached to the track path. The distal end of the lower door arm can move along the track path between the front path end and the rear path end.

An automatic door opening apparatus is disclosed for a vehicle that has a chassis, a door with front and rear ends, and a door frame with forward and rearward edges. The automatic door opening apparatus includes a body bracket, a cross member, an extension arm, a hinge post, a front motor, a middle motor and a rear motor. The body bracket has a front bracket end and a rear bracket end, where the rear bracket end is fixedly attached to the chassis. The cross member has a front member end and a rear member end, where the rear member end is hingedly coupled to the front bracket end of the body bracket at a rear hinge joint. The extension arm has a front arm end and a rear arm end, where the rear arm end is hingedly coupled to the front member end of the cross member at a middle hinge joint, and the front arm end is hingedly coupled to the door at a front hinge joint. The hinge post has a lower post end and an upper post end, where the lower post end is fixedly attached to the chassis, and the upper post end is coupled to the rear member end of the cross member and to the front bracket end of the body bracket at the rear hinge joint. The front motor controls motion of the front arm end of the extension arm relative to the door at the front hinge joint. The middle motor controls motion of the front member end of the cross member relative to the rear arm end of the extension arm at the middle hinge joint. The rear motor controls motion of the rear member end of the cross member relative to the front bracket end of the body bracket and the hinge post at the rear hinge joint. The front motor can be a programmable motor configured to control movement speed and rotation of the front arm end of the extension arm relative to the door at the front hinge joint. The middle motor can be a programmable motor configured to control movement speed and rotation of the front member end of the cross member relative to the rear arm end of the extension arm at the middle hinge joint. The rear motor can be a programmable motor configured to control movement speed and rotation of the rear member end of the cross member relative to the front bracket end of the body bracket and the hinge post at the rear hinge joint.

The front motor can include a front motor shaft aligned with the front hinge joint, where the front motor controls movement at the front hinge joint through the front motor shaft. The middle motor can include a middle motor shaft aligned with the middle hinge joint, where the middle motor controls movement at the middle hinge joint through the middle motor shaft. The rear motor can include a rear motor shaft aligned with the rear hinge joint, where the rear motor controls movement at the rear hinge joint through the rear motor shaft.

The front motor can include a front motor shaft that is out of alignment with the front hinge joint, where the front motor controls movement at the front hinge joint through the front motor shaft. The middle motor can include a middle motor shaft that is out of alignment with the middle hinge joint, where the middle motor controls movement at the middle hinge joint through the middle motor shaft. The rear motor can include a rear motor shaft that is out of alignment with the rear hinge joint, where the rear motor controls movement at the rear hinge joint through the rear motor shaft. The automatic door opening apparatus can also include a front pulley wheel, a front pulley belt, a middle pulley wheel, a middle pulley belt, a rear pulley wheel and a rear pulley belt. The front pulley wheel can be fixedly attached to the front arm end of the extension arm at the front hinge joint, and the front pulley belt can be connected to the front motor shaft and to the front pulley wheel, so that the front motor controls movement of the front arm end of the extension arm relative to the door at the front hinge joint through the front motor shaft, the front pulley belt and the front pulley wheel. The middle pulley wheel can be fixedly attached to the front member end of the cross member at the middle hinge joint, and the middle pulley belt can be connected to the middle motor shaft and to the middle pulley wheel, so that the middle motor controls movement of the front member end of the cross member relative to the rear arm end of the extension arm at the middle hinge joint through the middle motor shaft, the middle pulley belt and the middle pulley wheel. The rear pulley wheel can be fixedly attached to the rear member end of the cross member at the rear hinge joint, and the rear pulley belt can be connected to the rear motor shaft and to the rear pulley wheel, so that the rear motor controls movement of the rear member end of the cross member relative to the front bracket end of the body bracket and the hinge post at the rear hinge joint through the rear motor shaft, the rear pulley belt and the rear pulley wheel.

The middle motor and the rear motor can be attached to the cross member. The front, middle and rear motors can be configured to control movement of the door between a closed position where the door fills the door frame, and a fully-open position where the front end of the door is positioned rearward of the rearward edge of the door frame.

The automatic door opening apparatus can also include a floor track and a lower door arm. The floor track can extend from a front path end to a rear path end. The lower door arm can extend from a proximal end to a distal end, where the proximal end is fixedly attached to the door, the distal end is attached to the track path, and the distal end of the lower door arm can move along the track path between the front path end and the rear path end.

BRIEF DESCRIPTION OF THE DRAWINGS

The above-mentioned aspects of the present disclosure and the manner of obtaining them will become more apparent and the disclosure itself will be better understood by reference to the following description of the embodiments of the disclosure, taken in conjunction with the accompanying drawings, wherein.

Corresponding reference numerals are used to indicate corresponding parts throughout the several views.

DETAILED DESCRIPTION

The embodiments of the present disclosure described below are not intended to be exhaustive or to limit the disclosure to the precise forms in the following detailed description. Rather, the embodiments are chosen and described so that others skilled in the art may appreciate and understand the principles and practices of the present disclosure.

Figure 1:
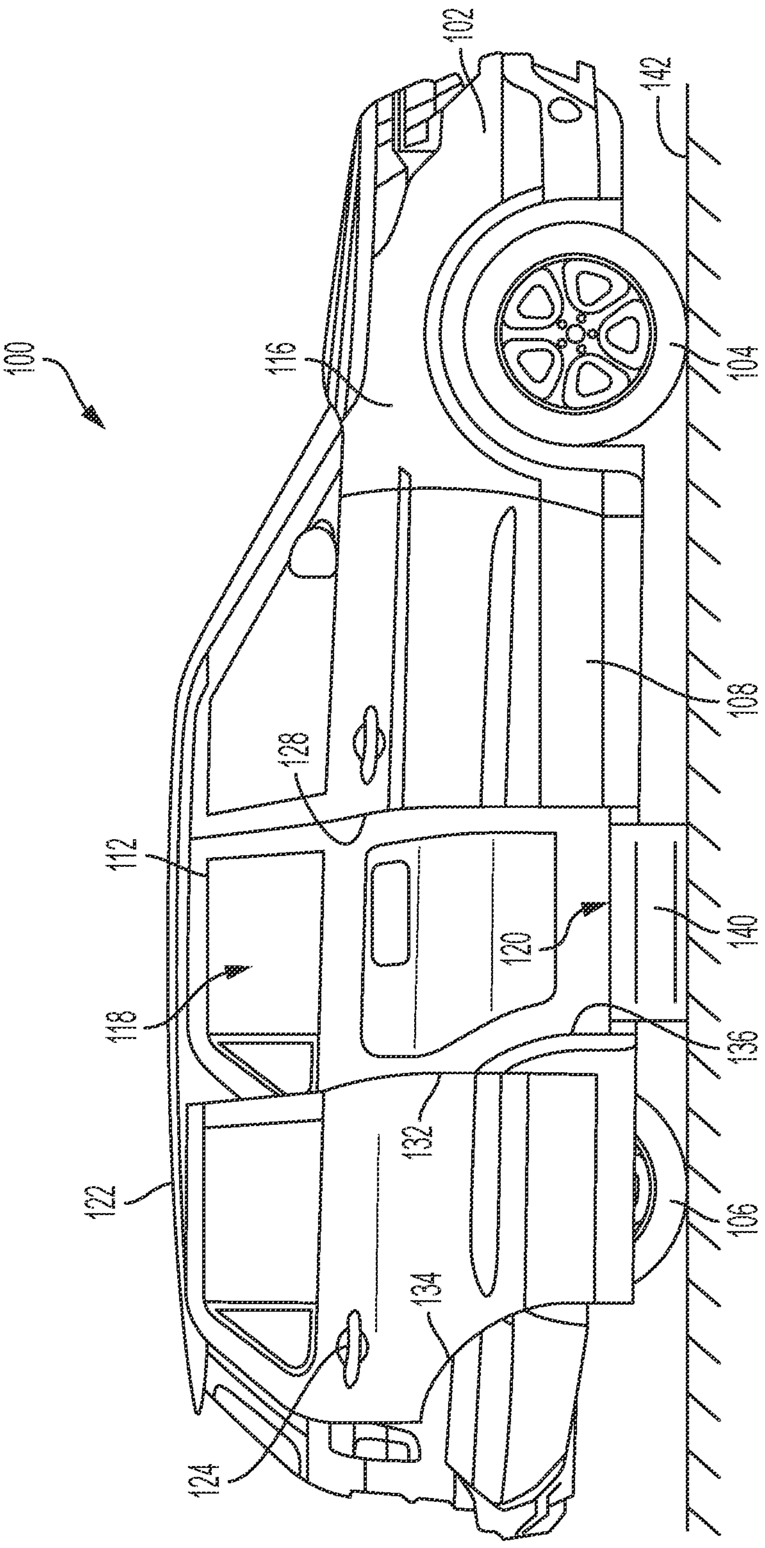
FIG. 1 illustrates an exemplary embodiment of a sport-utility vehicle or crossover vehicle with a modified rear side door.

FIG. 1 illustrates an exemplary embodiment of a sport-utility vehicle or crossover vehicle 100 available from any number of vehicle manufacturers. In one example, the vehicle is a Chevrolet Traverse manufactured by the Chevrolet division of General Motors. The vehicle may be constructed with a body on frame construction, a unibody construction, or other constructions. The vehicle 100 includes a vehicle body 102 coupled to front wheels 104 and rear wheels 106. A passenger side 116 of the vehicle 100 includes a front passenger side door 108 and a modified rear side door 110. The front side door 108 is located between the front wheels 104 and rear wheels 106 and provides access to a passenger for sitting in a front seat of the vehicle 100 adjacent to the driver. In this position, the passenger has a clearer forward view of the road when compared to sitting in a middle row or back row of seats of the vehicle 100.

The modified rear side door 110 includes a front end 132, a rear end 134, and a latch 124 for opening the rear side door 110. In a conventional SUV, the rear side door is hingedly connected at the front end 132 to two or more hinges coupled to a door frame of the vehicle such that the rear side door pivots about its hinges to open outwardly away from the vehicle. However, the modified rear side door 110 may not be hinged to a door frame, and in its open position shown in FIG. 1, the rear side door 110 may be positioned generally parallel with the passenger side 116 of the vehicle 100. In its closed position, the front end 132 of the rear side door 110 is adjacent to a B pillar 128 of the vehicle 100, and the rear end 134 of the rear side door 110 is adjacent to a rear side well 136. Unlike a minivan, the modified rear side door 110 may not slide along tracks between its open and closed positions. Instead, in this embodiment the modified rear side door 110 is coupled to the vehicle 100 by a door opening apparatus that pivots about multiple joints.

In addition to modifying the opening and closing of the rear side door 110, an access opening defined by a door frame opening 112 of the vehicle 100 may be modified or widened to provide access to a passenger seated in a wheelchair. In an SUV, the door frame opening 112 typically extends forward to the B pillar 128, rearward to the rear side well 136, downward to a vehicle floor 120, and upward to a vehicle roof 122. The vehicle 100 may be further modified to include a ramp assembly 140 that provides rolling access for a wheelchair from a ground surface 142 into an interior 118 of the vehicle 100. The ramp assembly 140 is installed at the door frame opening 112 and can be stored in the interior 118 of the vehicle 100. To accommodate the ramp assembly 140, the vehicle floor 120 may be lowered from the location of a conventional floor of the vehicle.

Figure 2:
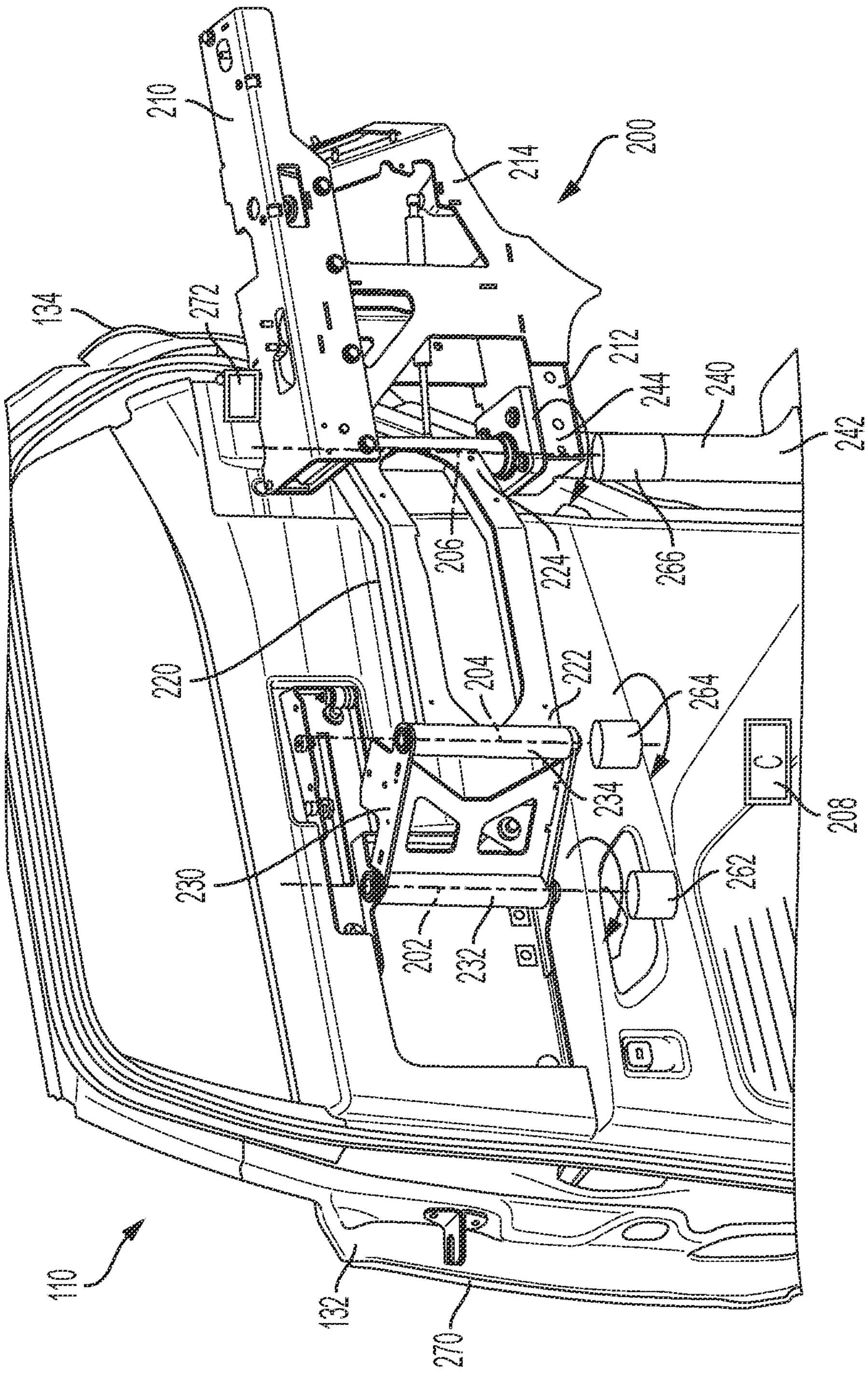
FIG. 2 illustrates an exemplary door opening apparatus coupled to the inside of the modified rear side door where the door opening apparatus includes three hinge joints.
Figure 4:
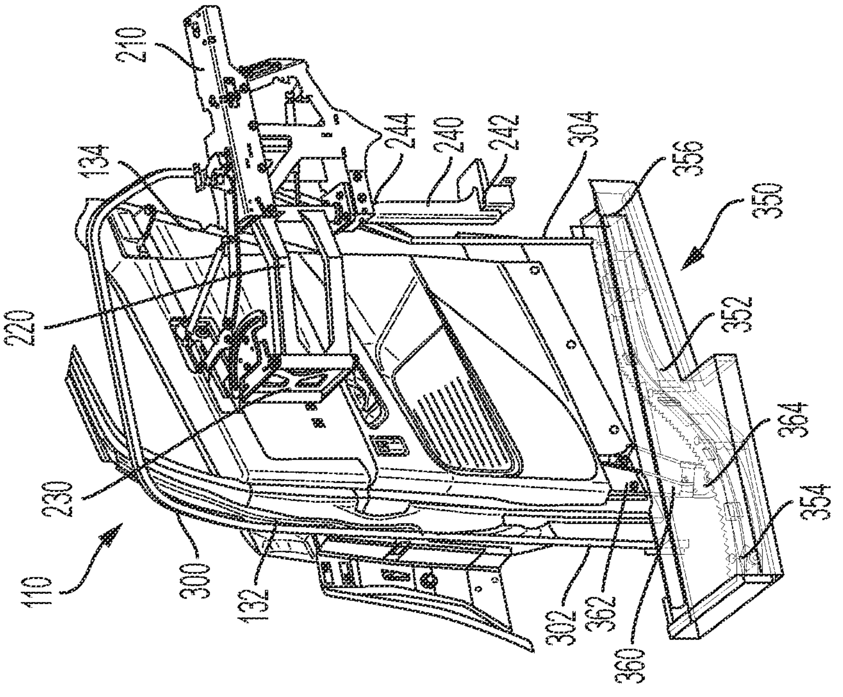
FIG. 4 illustrates the three joint door opening apparatus coupled to the inside of the modified rear side door when the door begins to open.
Figure 3:
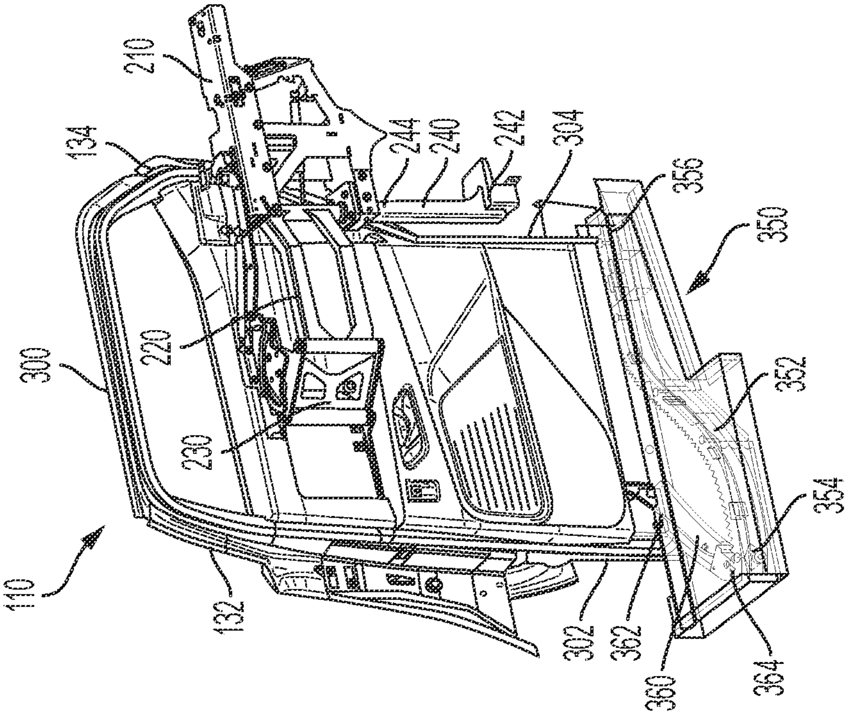
FIG. 3 illustrates the three joint door opening apparatus coupled to the inside of the modified rear side door when the door is in the closed position.
Figure 5:
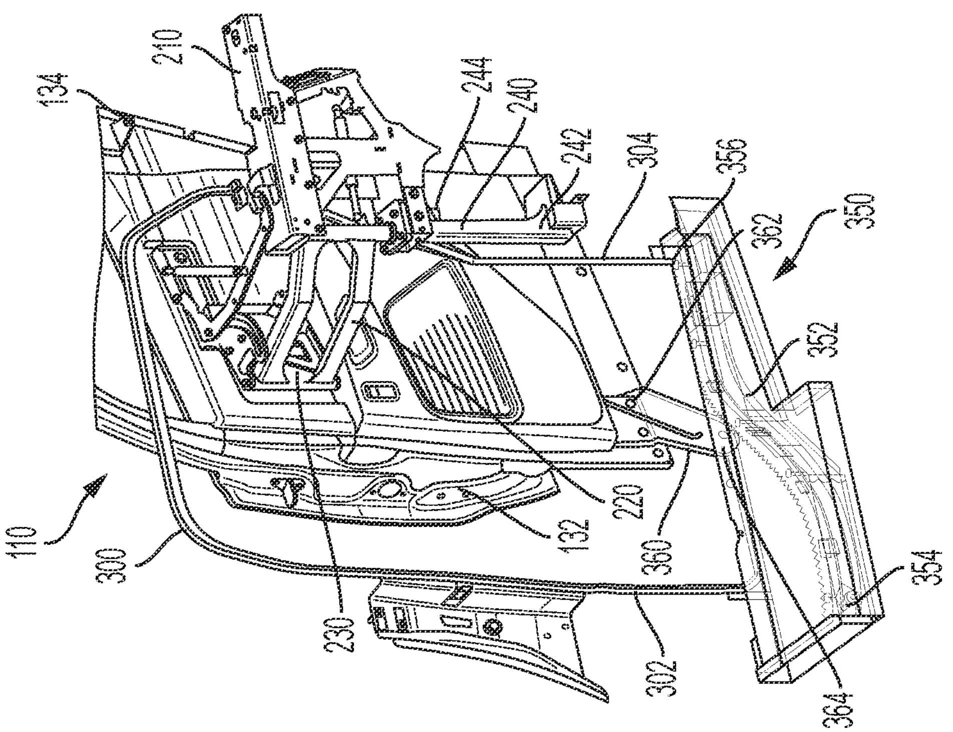
FIG. 5 illustrates the three joint door opening apparatus coupled to the inside of the modified rear side door as the door continues to open.

FIGS. 2-6 illustrate an exemplary door opening apparatus 200 coupled to the inside of the modified rear side door 110 where the door opening apparatus 200 includes three joints: a front hinge joint 202, a middle hinge joint 204 and a rear hinge joint 206. The modified rear side door 110 extends from the front end 132 to the rear end 134. In the closed position, the rear side door 110 fills the door frame opening 112. FIGS. 3-5 show a door frame opening 300 where a forward edge 302 of the door frame opening 300 would typically be adjacent to the B pillar 128 of the vehicle 100, and a rearward edge 304 of the door frame opening 300 would typically be adjacent to the rear side well 136.

The door opening apparatus 200 includes a controller 208, a body bracket 210, a cross member 220, an extension arm 230, a hinge post 240 and a floor track 350. The body bracket 210 extends from a front bracket end 212 to a rear bracket end 214. The cross member 220 extends from a front member end 222 to a rear member end 224. The extension arm 230 extends from a front arm end 232 to a rear arm end 234. The hinge post 240 may be an elongated post that extends from a lower post end 242 to an upper post end 244.

The rear bracket end 214 of the body bracket 210 is fixedly coupled to the vehicle 100, for example rearward of the rearward edge 304 of the door frame opening 300. The front bracket end 212 of the body bracket 210 is coupled to the hinge post 240 and to the rear member end 224 of the cross member 220. The rear member end 224 of the cross member 220 is hingedly attached to the front bracket end 212 of the body bracket 210 at the rear hinge joint 206. The front member end 222 of the cross member 220 is hingedly attached to the rear arm end 234 of the extension arm 230 at the middle hinge joint 204. The front arm end 232 of the extension arm 230 is hingedly attached to the interior of the rear door 110 at the front hinge joint 202. The lower post end 242 of the hinge post 240 is coupled to the vehicle 100, for example at the vehicle floor 120 or the rear side well 136 rearward of the rearward edge 304 of the door frame opening 300. The upper post end 244 of the hinge post 240 is coupled to the rear hinge joint 206 such that the rear member end 224 of the cross member 220 can hingedly move relative to the front bracket end 212 of the body bracket 210 at the rear hinge joint 206.

The floor track 350 includes a track path 352 and a lower door arm 360. The track path 352 extends from a front path end 354 to a rear path end 356. The lower door arm 360 extends from a proximal end 362 to a distal end 364. The proximal end 362 of the lower door arm 360 is fixedly attached at or near the bottom of the rear side door 110. The distal end 364 of the lower door arm 360 is attached to the track path 352 such that the distal end 364 of the lower door arm 360 can move along the track path 352 between the front path end 354 and the rear path end 356.

The rear member end 224 of the cross member 220 can hingedly move relative to the front bracket end 212 of the body bracket 210 and relative to the hinge post 240 at the rear hinge joint 206. The front member end 222 of the cross member 220 and the rear arm end 234 of the extension arm 230 can hingedly move relative to one another at the middle hinge joint 204. The front arm end 232 of the extension arm 230 and the rear door 110 can hingedly move relative to one another at the front hinge joint 202. The distal end 364 of the lower door arm 360 can move along the track path 352 between the front path end 354 and the rear path end 356.

The door opening apparatus 200 can also include one or more sensors to monitor the door state or other parameters, for example a close obstruction sensor 270 and a close sensor 272. The close obstruction sensor 270 can be located at the leading edge of the front end 132 of the door 110 to detect obstructions during a door closing cycle. If an obstruction is detected by the close obstruction sensor 270 then the controller 208 can command the door 110 to open. The door opening apparatus 200 could also include an open obstruction sensor that could be located at the trailing edge of the rear end 134 of the door 110 to detect obstructions during a door opening cycle. If an obstruction is detected by the open obstruction sensor then the controller 208 can command the door 110 to close. The close obstruction sensor 270 and/or open obstruction sensor can be a pinch sensor or other type of sensor that can detect an obstruction encountered during the closing or opening of the door 110. The close sensor 272 can detect when the door 110 is fully closed. The close sensor 272 can be located between the body bracket 210 and the interior of the door 110 to detect when the door 110 is fully closed. The close sensor 272 can be located in alternative locations to sense full closure of the door 110. If the close sensor 272 indicates that the door 110 is not fully closed, then the controller 208 can activate a warning light or provide some other signal to indicate that the door 110 is not fully closed.

Figure 6:
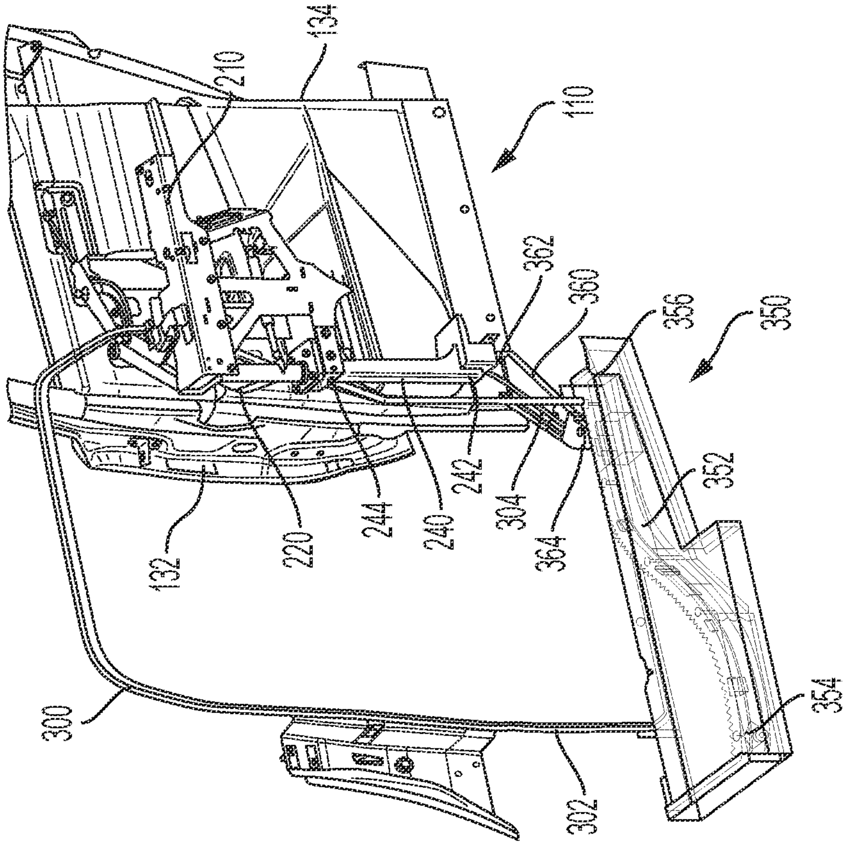
FIG. 6 illustrates the three joint door opening apparatus coupled to the inside of the modified rear side door when the door is in the fully open position.

FIGS. 3-6 show an exemplary progression of the rear door 110 as it moves from a closed position (FIG. 3) to a fully open position (FIG. 6). The controller 208 can control and monitor movement of the door 110 and the door opening apparatus 200 during the open and close cycles. The progression can be reversed with similar, but not necessarily identical motion, to move the rear door 110 from the fully open position (FIG. 6) to the closed position (FIG. 3). In FIG. 3, the closed position, the distal end 364 of the lower door arm 360 is at or near the front path end 354 of the track path 352 and the rear door 110 fills the door frame opening 300.

In FIG. 4, the rear door 110 begins to open, and the distal end 364 of the lower door arm 360 moves along the track path 352 away from the front path end 354 and towards the rear path end 356. The front end 132 of the rear side door 110 moves away from the forward edge 302 of the door frame opening 300, and the rear end 134 of the rear side door 110 moves away from the rearward edge 304 of the door frame opening 300. The motion of the rear door 110 causes the front arm end 232 of the extension arm 230 to hingedly move back toward the rearward edge 304 of the door frame opening 300, which causes the rear arm end 234 of the extension arm 230 to hingedly move relative to the front member end 222 of the cross member 220. This motion causes the rear end 134 of the rear side door 110 to move out away from the passenger side 116 of the vehicle 100.

In FIG. 5, the rear door 110 opens further, and the distal end 364 of the lower door arm 360 moves further along the track path 352 away from the front path end 354 and towards the rear path end 356. The front end 132 of the rear side door 110 moves further away from the forward edge 302 of the door frame opening 300, and the rear end 134 of the rear side door 110 moves further away from the rearward edge 304 of the door frame opening 300. The motion of the rear door 110 causes the extension arm 230 to almost become adjacent to and parallel with the interior of the rear door 110 where the rear arm end 234 of the extension arm 230 is closer to the forward edge 302 of the door frame opening 300 and the front arm end 232 of the extension arm 230 is closer to the rearward edge 304 of the door frame opening 300. This movement also causes the front member end 222 of the cross member 220 to hingedly move back toward the rearward edge 304 of the door frame opening 300, which causes the rear member end 222 of the cross member 220 to hingedly move relative to the front bracket end 212 of the body bracket 210. This motion causes the rear end 134 of the rear side door 110 to move back towards the passenger side 116 of the vehicle 100.

In FIG. 6, the rear door 110 is fully open, and the distal end 364 of the lower door arm 360 is at or near the rear path end 356 of the track path 352. The front end 132 of the rear side door 110 is adjacent to or rearward of the rearward edge 304 of the door frame opening 300. The extension arm 230 is near or touching the interior of the rear door 110 with the rear arm end 234 of the extension arm 230 closer to the forward edge 302 than the front arm end 232 of the extension arm 230. The rear member end 222 of the cross member 220 is, or is almost, completely hinged back such that both the front member end 222 and the rear member end 222 of the cross member 220 are rearward of the rearward edge 304 of the door frame opening 300. This fully open position causes the rear side door 110 to be generally parallel with the passenger side 116 of the vehicle 100 and rearward of the rearward edge 304 of the door frame opening 300 to provide access to the entire door frame opening 300.

One, two, three, or more programmable motors 262, 264, 266 under the control of the controller 208 can control the motion of the door opening apparatus 200 about the front, middle and rear hinge joints 202, 204, 206, respectively. The speeds and timing of each of the motors 262, 264, 266 can be independently controlled during the opening and closing of the rear side door 110. The front motor 262 can control motion of the front arm end 232 of the extension arm 230 relative to the rear door 110 at the front hinge joint 202. The middle motor 264 can control motion of the front member end 222 of the cross member 220 relative to the rear arm end 234 of the extension arm 230 at the middle hinge joint 204. The rear motor 266 can control motion of the rear member end 224 of the cross member 220 relative to the front bracket end 212 of the body bracket 210 and the hinge post 240 at the rear hinge joint 206.

Figure 7:
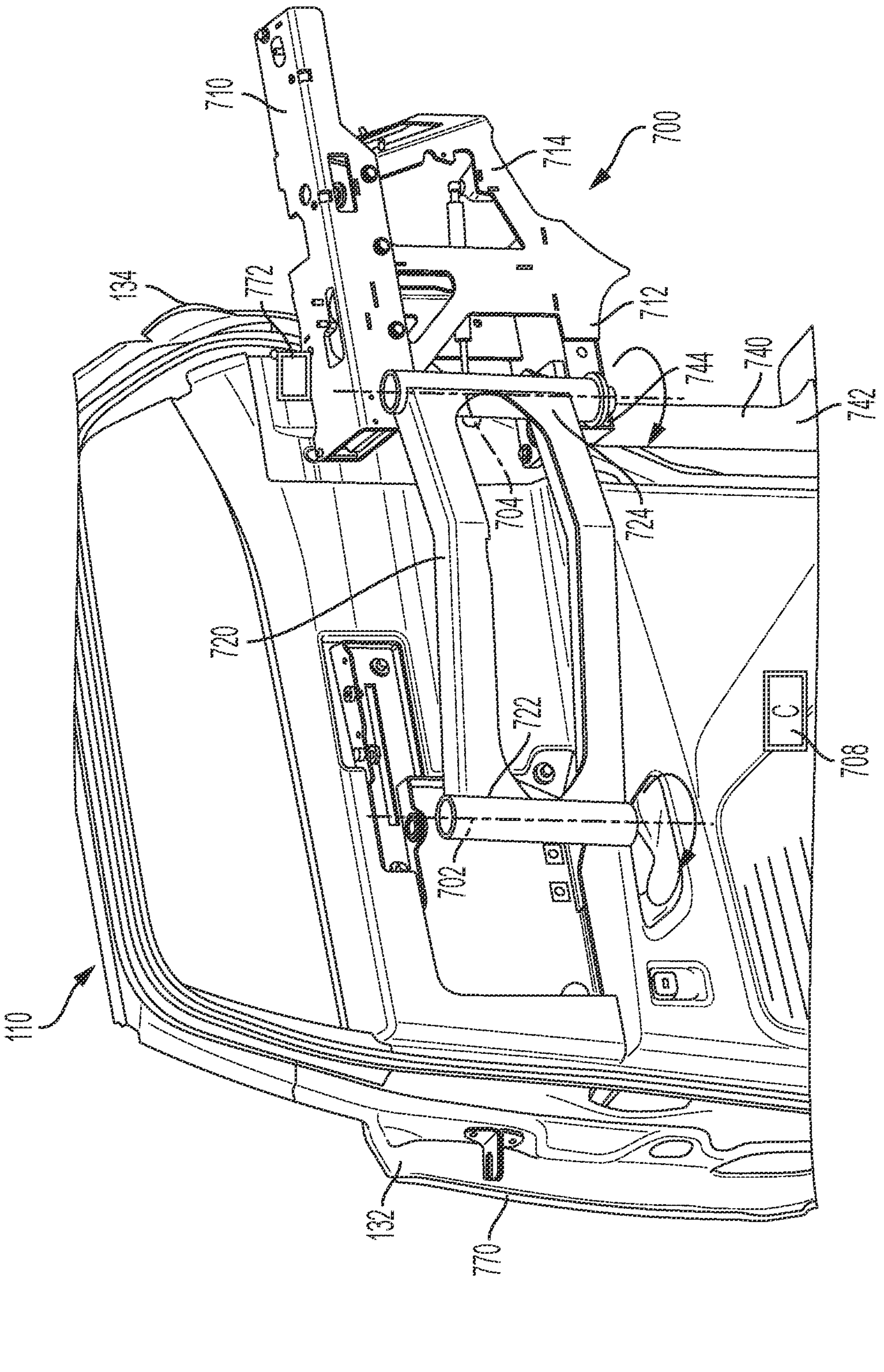
FIG. 7 illustrates an exemplary door opening apparatus coupled to the inside of the modified rear side door where the door opening apparatus has only two hinge joints.
Figure 8:
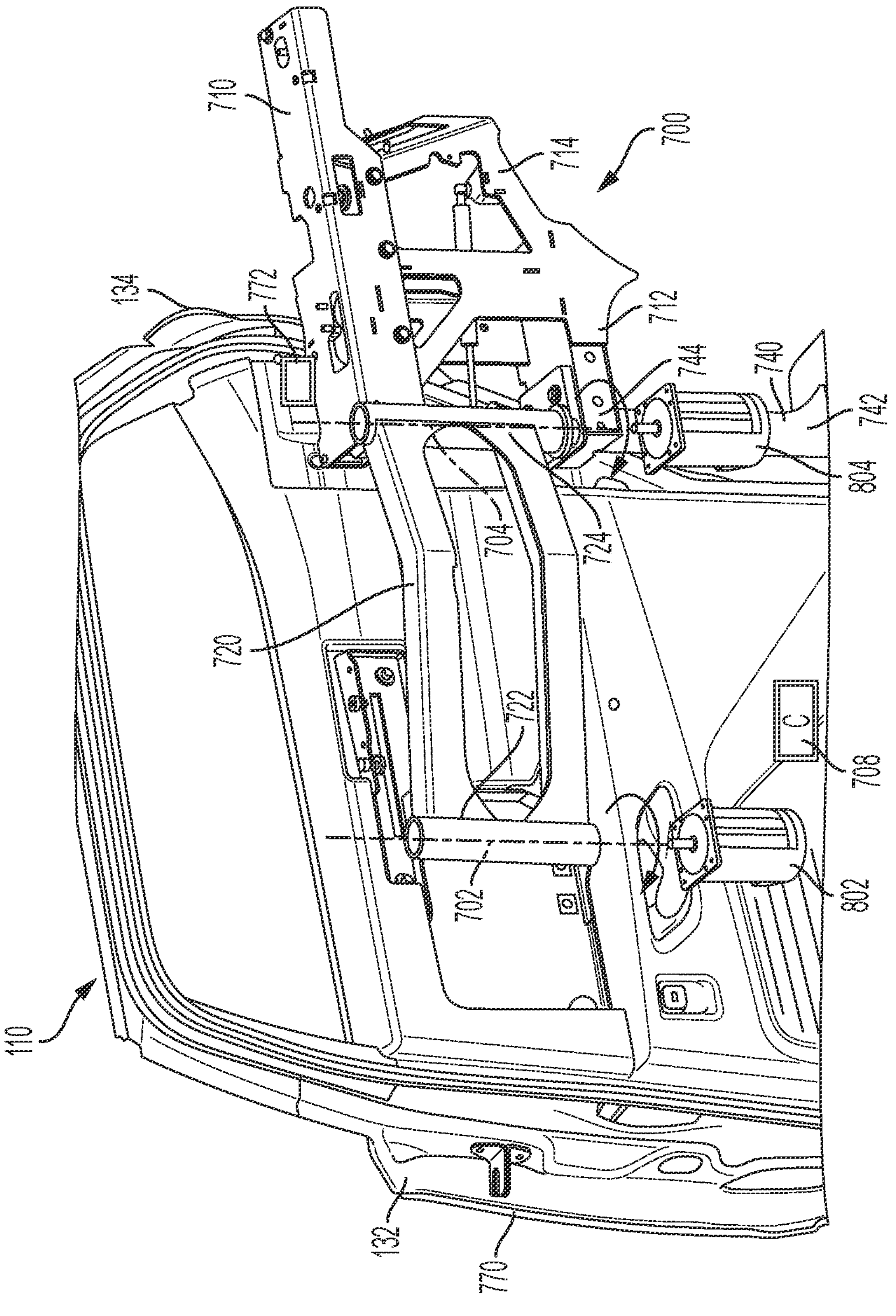
FIG. 8 illustrates the two joint door opening apparatus with motors attached at each of the two hinge joints.

FIGS. 7 and 8 illustrate an exemplary door opening apparatus 700 coupled to the inside of the modified rear side door 110 where the door opening apparatus 700 has only two joints: a front hinge joint 702 and a rear hinge joint 704. The modified rear side door 110 extends from the front end 132 to the rear end 134. In the closed position, the rear side door 110 fills the door frame opening 112.

The door opening apparatus 700 includes a controller 708, a body bracket 710, a cross member 720, a hinge post 740 and a floor track similar to the floor track 350 shown in FIGS. 3-6. The body bracket 710 extends from a front bracket end 712 to a rear bracket end 714. The cross member 720 extends from a front member end 722 to a rear member end 724. The hinge post 740 may be an elongated post that extends from a lower post end 742 to an upper post end 744.

The rear bracket end 714 of the body bracket 710 is fixedly coupled to the vehicle 100, for example rearward of the rearward edge 304 of the door frame opening 300. The front bracket end 712 of the body bracket 710 is coupled to the hinge post 740 and to the rear member end 724 of the cross member 720. The rear member end 724 of the cross member 720 is hingedly attached to the front bracket end 712 of the body bracket 710 at the rear hinge joint 704. The front member end 722 of the cross member 720 is hingedly attached to the interior of the rear door 110 at the front hinge joint 702. The lower post end 742 of the hinge post 740 is coupled to the vehicle 100, for example at the vehicle floor 120 or the rear side well 136 rearward of the rearward edge 304 of the door frame opening 300. The upper post end 744 of the hinge post 740 is coupled to the rear hinge joint 704 such that the rear member end 724 of the cross member 720 can hingedly move relative to the front bracket end 712 of the body bracket 710 at the rear hinge joint 704.

The rear member end 724 of the cross member 720 can hingedly move relative to the front bracket end 712 of the body bracket 710 and relative to the hinge post 740 at the rear hinge joint 704. The front member end 722 of the cross member 720 and the rear door 110 can hingedly move relative to one another at the front hinge joint 702.

Figure 9:
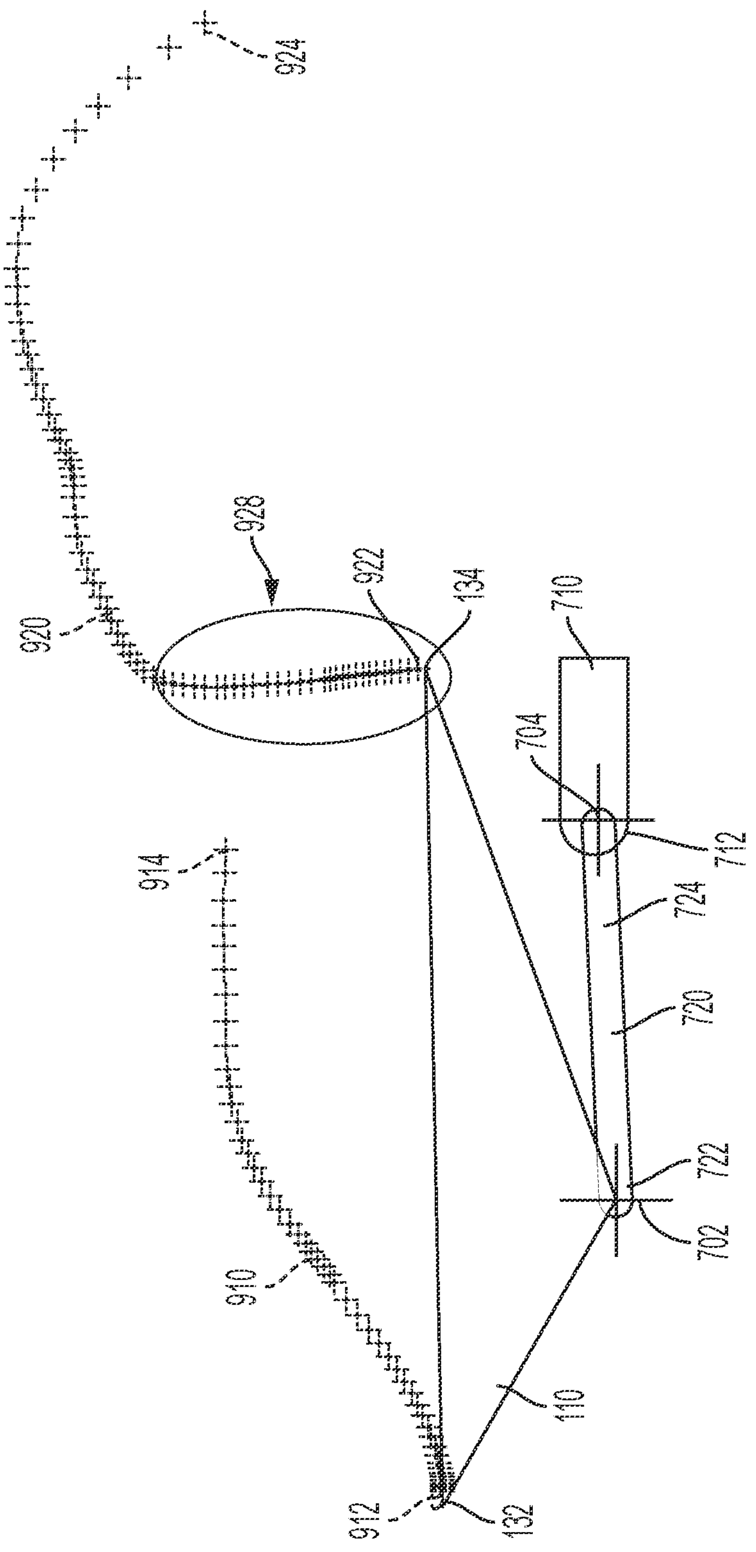
FIG. 9 illustrates an exemplary motion of a modified rear side door with a two joint door opening apparatus as the door moves between the closed and open positions.

FIG. 9 illustrates an exemplary motion of the modified rear side door 110 with the two joint door opening apparatus 700 as the rear side door 110 moves between the closed and open positions. The front end 132 of the rear side door 110 follows a front track 910, and the rear end 134 of the rear side door 110 follows a rear track 920. FIG. 9 also shows the front and rear hinge joints 702, 704 when the rear side door 110 is in the closed position. The rear side door 110 moves outward during the Open path to clear the passenger side quarter panel of the vehicle 100. A mechanically linked door is forced to follow the same path forward and backwards due to the linkages, while a programmable motor controlled digital door can follow independent paths forward and backwards.

When the rear side door 110 is in the closed position, the front end 132 is at the forward edge 302 of the door frame opening 300 shown at a closed position 912 on the front track 910, and the rear end 134 is at the rearward edge 304 of the door frame opening 300 shown at the closed position 922 of the rear track 920. As the rear side door 110 begins to open the rear member end 724 of the cross member 720 begins to pivot about the rear hinge joint 704 in a clockwise direction, and the rear side door 110 begins to pivot counterclockwise about the front hinge joint 702 relative to the front member end 722 of the cross member 720 which starts movement of the rear side door 110 away from the passenger side 116 of the vehicle 100. The front end 132 moves back along the front track 910 away from the closed position 912 primarily in a longitudinal direction (generally parallel to the passenger side 116 of the vehicle), and the rear end 134 moves along the rear track 920 away from the closed position 922 primarily in a lateral direction (generally perpendicular to the passenger side 116 of the vehicle). Note that as the rear side door 110 begins to open, the rear end 134 moves along an initial outward section 928 primarily out and away from the passenger side 116 of the vehicle 100, and possible in a slightly forward direction, along the rear track 920. In that respect, the door 110 may initially be seen to primarily rotate counterclockwise about its vertical axis (when viewed from above) as the rear hinge joint 704 begins to rotate. The motor 802 operating the front hinge joint 702 may initially be operated at a first speed in a counterclockwise direction, which may be a faster than a speed of the motor 804 operating the rear hinge joint 704, so that the rear end 134 of the door 110 may clear the rearward edge 304 of the door frame opening 300 before the rear end 134 of the door begins to move primarily rearward. As the rear side door 110 continues to open the rear member end 724 of the cross member 720 continues to pivot about the rear hinge joint 704 in a clockwise direction, and the rear side door 110 continues to pivot about the front hinge joint 702 relative to the front member end 722 of the cross member 720 which moves the rear side door 110 away from the passenger side 116 of the vehicle 100 and back away from the forward edge 302 of the door frame opening 300. The front end 132 continues to move along the front track 910, and the rear end 134 continues to move along the rear track 920. During this stage of the door opening sequence, the motor 802 operating the front hinge joint 702 may operate at a second speed that is either slower than or in a reverse direction relative to the first speed, whereby the door 10 may be seen to alternate from rotating in a counterclockwise direction to rotating in a clockwise direction about its vertical axis. As the rear side door 110 continues to open the rear member end 724 of the cross member 720 continues to pivot about the rear hinge joint 704 in a clockwise direction, and the rear side door 110 continues to pivot about the front hinge joint 702 relative to the front member end 722 of the cross member 720 which moves the rear side door 110 more parallel with the passenger side 116 of the vehicle 100. In that respect, during this stage of the door opening sequence, the motor 802 operating the front hinge joint 702 may operate at a third speed that is either slower than or in a reverse direction relative to the first speed whereby the door 110 may be seen to rotate primarily in a clockwise direction about its vertical axis, eventually bringing the door 110 back to an orientation generally parallel with the passenger side 116 of the vehicle 100. When the rear side door 110 is fully open the rear member end 724 of the cross member 720 fully pivots about the rear hinge joint 704, and the rear side door 110 fully pivots about the front hinge joint 702 relative to the front member end 722 of the cross member 720 which moves the rear side door 110 substantially parallel to the passenger side 116 of the vehicle 100 with the front end 132 of the rear side door 110 near or rearward of the rearward edge 304 of the door frame opening 300. When the rear side door 110 is in the fully open position, the front end 132 is at the fully open position 914 of the front track 310, and the rear end 134 is at the fully open position 924 of the rear track 920. In the fully open position, the rear side door 110 is back to provide access to the entire door frame opening 300 of the vehicle 100.

Motors 802, 804 under the control of the controller 708 can control the motion of the door opening apparatus 700 about the front and rear hinge joints 702, 704, respectively. Controller 708 may be a single controller controlling both motors 802, 804. In the alternative, motors 802, 804 may be programmable motors that each include a controller that collectively perform the function of controller 708. By virtue of controller 708, the speeds and timing of each of the motors 802, 804 can be independently controlled during the opening and closing of the rear side door 110. The front motor 802 can control motion of the front member end 722 of the cross member 720 relative to the rear door 110 at the front hinge joint 702. The rear motor 804 can control motion of the rear member end 724 of the cross member 720 relative to the front bracket end 712 of the body bracket 710 and the hinge post 740 at the rear hinge joint 704.

The door opening apparatus 700 can also include one or more sensors to monitor the door state or other parameters, for example a close obstruction sensor 770 and a close sensor 772. The close obstruction sensor 770 can be located at the leading edge of the front end 132 of the door 110 to detect obstructions during a door closing cycle. If an obstruction is detected by the close obstruction sensor 770 then the controller 708 can command the door 110 to open. The door opening apparatus 700 could also include an open obstruction sensor that could be located at the trailing edge of the rear end 134 of the door 110 to detect obstructions during a door opening cycle. The close sensor 772 can detect when the door 110 is fully closed. The close sensor 772 can be located between the body bracket 710 and the interior of the door 110, or in alternative locations, to detect when the door 110 is fully closed. If the close sensor 772 indicates that the door 110 is not fully closed, then the controller 708 can activate a warning light or provide some other signal to indicate that the door 110 is not fully closed.

Figure 10:
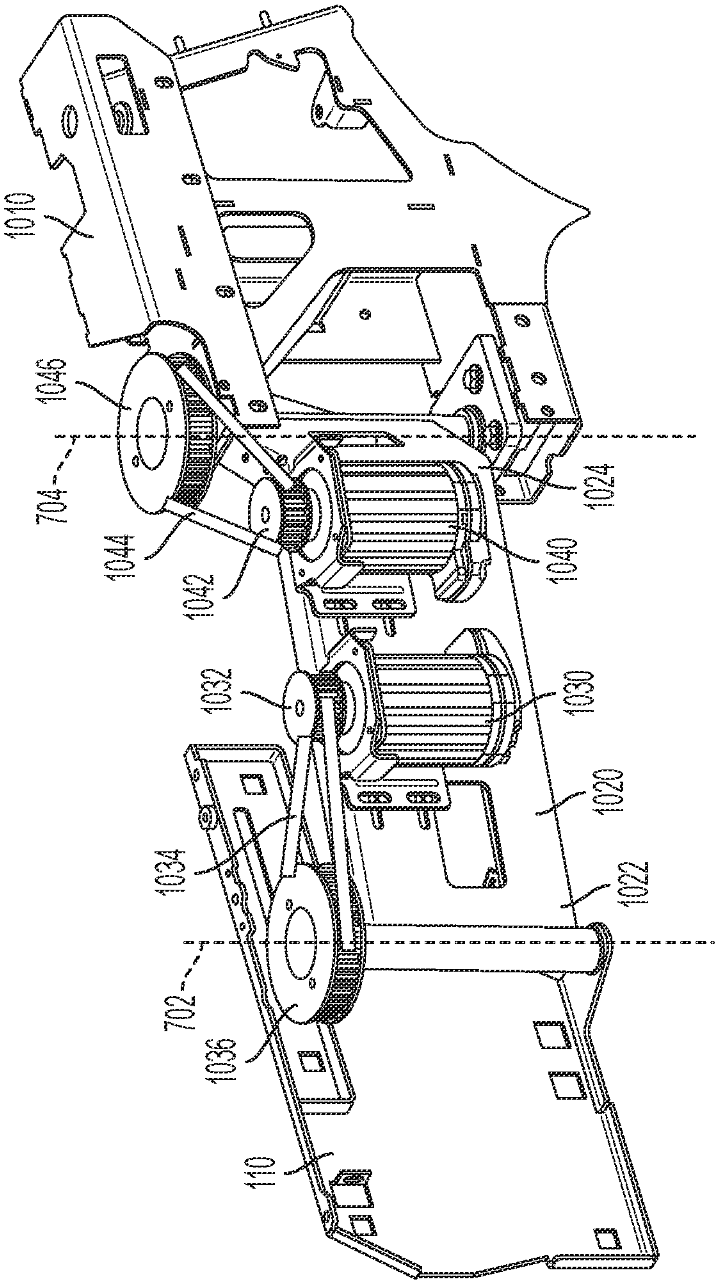
FIG. 10 illustrates an exemplary embodiment of a portion of a two joint door opening apparatus where the motors are mounted out-of-line with the hinge joints.

FIGS. 2 and 8 show the motors at the point of rotation, at the hinge joints, which can side load the motor shafts. Alternatively, the motors can be mounted at locations not at the hinge joints and pulleys can be used between the motors and the hinge joints to remove the side loading of the motor shafts. FIG. 10 illustrates an exemplary embodiment of a portion of a two hinge joint door opening apparatus 1000 that has a front hinge joint 702 and a rear hinge joint 704. The door opening apparatus 1000 includes a body bracket 1010, a cross member 1020, and programmable front and rear motors 1030, 1040, respectively. The front motor 1030 has a motor shaft 1032, and the rear motor 1040 has a motor shaft 1042. The cross member 1020 extends from a front member end 1022 to a rear member end 1024. The rear member end 1024 of the cross member 1020 is hingedly attached to the front end of the body bracket 1010 at the rear hinge joint 704. The front member end 1022 of the cross member 1020 is hingedly attached to the interior of the rear door 110 at the front hinge joint 702.

The front motor 1030 is attached to the cross member 1020 such that the motor shaft 1032 is not in line with the front hinge joint 702. A front pulley wheel 1036 is pivotally attached to the front member end 1022 of the cross member 1020 and fixedly attached to the door 110 at the front hinge joint 702. A front pulley belt 1034 attaches the motor shaft 1032 of the front motor 1030 to the front pulley wheel 1036 at the front hinge joint 702. Motion of the motor shaft 1032 of the front motor 1030 controls motion of the front pulley belt 1034 which controls motion of the front pulley wheel 1036, so that the front motor 1030 can control motion of the front member end 1022 of the cross member 1020 relative to the rear door 110 at the front hinge joint 702.

The rear motor 1040 is attached to the cross member 1020 such that the motor shaft 1042 is not in line with the rear hinge joint 704. A rear pulley wheel 1046 is pivotally attached to the rear member end 1024 of the cross member 1020 and fixedly attached to the body bracket 1010 at the rear hinge joint 704. A rear pulley belt 1044 attaches the motor shaft 1042 of the rear motor 1040 to the rear pulley wheel 1046 at the rear hinge joint 704. Motion of the motor shaft 1042 of the rear motor 1040 controls motion of the rear pulley belt 1044 which controls motion of the rear pulley wheel 1046, so that the rear motor 1040 can control motion of the rear member end 1024 of the cross member 1020 relative to the front end of the body bracket 1010 at the rear hinge joint 704.

A similar mechanism can be used with a three hinge joint door opening apparatus to mount the motors at locations not at the hinge joints. In the two or three hinge joint door opening apparatuses, the various motors can be mounted at various locations on the various components, for example the cross member, the extension arm, the hinge post, the door, the body bracket, etc. The motors can be mounted at or away from the point of rotation. Pulleys are just one example of mechanisms that can be used to couple the motors to the hinge joints, and other mechanisms known to those of skill in the art can be used.

The extension arm 230 and the middle hinge joint 204 allows the door opening apparatus 200 with three joints to more easily move the modified rear side door 110 further out from the passenger side 116 of the vehicle 100 during the opening/closing operation, and to more easily move the modified rear side door 110 further back when the modified rear side door 110 is fully open to accommodate wider ramps and/or wheelchairs. However, the two joint door opening apparatus 700 is usually preferable to the three joint door opening apparatus 200 since it uses one less motor and no extension arm, which reduces cost. However, some target vehicles may require the additional clearance and opening ability provided by the three joint door opening apparatus 200.

The two joint door opening apparatus 700 and three joint door opening apparatus 200 are designed to be easily customized to many different vehicles with minor modifications. The body bracket 210, 710 would be customized to attach to the vehicle floor 120 or the rear side well 136 rearward of the rearward edge 304 of the door frame opening 300 of a target vehicle. The length of the hinge post 240, 740 and/or the attachment of the lower post end 242, 742 to the floor 120 or the rear side well 136 of the target vehicle may also need to be customized. The attachment of the cross member 720 in the two joint door opening apparatus 700, or the extension arm 230 in the three joint door opening apparatus 400, to the rear side door 110 of the target vehicle at the front hinge joint 702, 202 would also be customized. Thus, it is primarily the attachment points to the target vehicle that would need customization.

In some instances, the length and/or shape of the cross member 220, 720 and/or the extension arm 230 may also need to changed. However, the baseline plug-and-play design of the components, joints and motors for the two joint door opening apparatus 700 or three joint door opening apparatus 200 remain basically the same.

Any one or more of the motors may be reversable, in that they may be operated in either direction. The motors may also be fixed speed or variable speed. In any given door opening apparatus 200, 700, the motors may comprise all fixed speed, all variable speed, or a combination of fixed speed and variable speed motors. While the embodiments shown and describe include pivoting joints 202, 204, 206, 702, 704 between components of the door opening apparatus 200, 700, motorized linear movement mechanisms (e.g., linear actuators, motorized rack and pinion mechanisms, etc.) may also be incorporated into the door opening apparatus 200, 700 to provide the door with additional freedom of movement. For example, front hinge joint 702 may be moveable relative to the door via a linear movement mechanism either rearward toward the rear end 134 or forward toward the front end 132 of the door 110. The rear hinge joint 702 may similarly be moveable toward a front of the vehicle 100 or a rear of the vehicle. In another embodiment, the length of the cross member 720 may be adaptable via a linear movement mechanism to place the front hinge joint 702 and rear hinge joint 704 further apart or closer together. In yet another embodiment, front hinge joint 702 may be moveable laterally relative to the door while the rear hinge joint 704 may be moveable laterally relative to the vehicle 100.

In any one or more of the embodiments discussed herein, the controller 208, 708 may be programmed to independently vary the speed and/or direction of the motors 262, 264, 266, 802, 804 during a door opening sequence to control the paths of the front edge 132 and rear end 134 of the door (i.e., the front track 910 and rear track 920, respectively) as the door moves from the closed position to an open position. The controller 208, 708 may be programmed with a door closing sequence that is the same but opposite from the door opening sequence. In the alternative, the door closing sequence may be different from the door opening, whereby the front track 910 and rear track 920 differ depending upon whether the door is opening or closing. Ideally, the same or substantially the same door opening apparatus 200, 700 may be used with the doors 110 of two different vehicles, whereby the only substantial difference between the two will be the controller 208, 708 programming for the front track 910 and rear track 920.

The door opening apparatus 200, 700 converts the side door 110 from a swing door to the practical equivalent of a slide door. The motors convert the side door 110 from a manual door to a power door, and replace mechanical complexity with programmable digitization. The programmable motors can control kinematic path, motion, speed, rotation, and sensitivity (kickback) of the side door 110 throughout the open/close progression. The motors can provide absolute position sensing and control of the side door 110, with full digital control and operation of speed and rotation at each of the hinge joints.

The plug-and-play design of the door opening apparatus 200, 700 shortens new vehicle development time, and can reduce assembly complexity and process sensitivity.

While the disclosure has been illustrated and described in detail in the drawings and foregoing description, such illustration and description is to be considered as exemplary and not restrictive in character, it being understood that illustrative embodiment(s) have been shown and described and that all changes and modifications that come within the spirit of the disclosure are desired to be protected. It will be noted that alternative embodiments of the present disclosure may not include all of the features described yet still benefit from at least some of the advantages of such features. Those of ordinary skill in the art may readily devise their own implementations that incorporate one or more of the features of the present disclosure and fall within the spirit and scope of the present invention as defined by the appended claims.

We claim:

1. A vehicle having a vehicle body, a door with a front end and a rear end, and an automatic door opening apparatus, the automatic door opening apparatus comprising:

a cross member coupled to the door at a first hinge joint and coupled to the vehicle body at a second hinge joint;

at least a first motor and a second motor, wherein the first motor is configured to rotate the door relative to the cross member at the first hinge joint and the second motor is configured to rotate the cross member relative to the vehicle body at the second hinge joint; and, at least one controller programmed to independently operate the first motor and the second motor to control a location of the front end along a first path and a location of the rear end along a second path during a door opening sequence;

wherein, in a first stage of the door opening sequence, the front end of the door moves primarily in a longitudinal direction and the rear end of the door moves primarily in a lateral direction.

2. The vehicle of claim 1, wherein, in the first stage of the door opening sequence, the first motor is configured to rotate the door in a first rotational direction relative to the cross member.

3. The vehicle of claim 2, wherein, in the first stage of the door opening sequence, the second motor is configured to rotate the cross member in a second direction relative to the vehicle, the second rotational direction being opposite from the first rotational direction.

4. The vehicle of claim 3, wherein, in the first stage of the door opening sequence, the door rotates in the first rotational direction relative to a vertical axis of the door.

5. The vehicle of claim 3, wherein, in the first stage of the door opening sequence, the first motor operates at a first speed that is greater than a speed of the second motor.

6. The vehicle of claim 4, wherein, in a second stage of the door opening sequence, the front end and the rear end of the door move primarily in the longitudinal direction.

7. The vehicle of claim 6, wherein, in the second stage of the door opening sequence, the first motor operates at a second speed that is less than or in a reverse direction from the first speed.

8. The vehicle of claim 6, wherein, in the second stage of the door opening sequence, the door transitions from rotating in the first rotational direction relative to the vertical axis of the door to rotating in the second rotational direction relative to the vertical axis.

9. The vehicle of claim 8, wherein, in a third stage of the door opening sequence, the door is moved to a fully open position that is substantially parallel to a side of the vehicle.

10. The vehicle of claim 9, wherein the front end of the door is near or rearward of a rear edge of a door frame opening at a vehicle floor level.

11. The vehicle of claim 9, wherein, in the first stage of the door opening sequence, the rear end of the door moves at least slightly in a forward direction.

12. A method for modifying a door of a vehicle from a manual swing door into a motorized equivalent of a sliding door, the method comprising:

coupling an automatic door opening apparatus between a vehicle body and the door, the automatic door opening apparatus comprising:

a cross member coupled to the door at a first hinge joint and coupled to the vehicle body at a second hinge joint;

at least a first motor and a second motor, wherein the first motor is configured to rotate the door relative to the cross member at the first hinge joint and wherein the second motor is configured to rotate the cross member relative to the vehicle body at the second hinge joint; and, at least one controller programmed to independently operate the first motor and the second motor to control a location of the front end along a first path and a location of the rear end along a second path during a door opening sequence;

wherein, in a first stage of the door opening sequence, the front end of the door moves primarily in a longitudinal direction and the rear end of the door moves primarily in a lateral direction.

13. The method of claim 12, wherein, in the first stage of the door opening sequence, the first motor is configured to rotate the door in a first rotational direction relative to the cross member and the second motor is configured to rotate the cross member in a second direction relative to the vehicle, the second rotational direction being opposite from the first rotational direction.

14. The method of claim 13, wherein, in a second stage of the door opening sequence, the front end and the rear end of the door move primarily in the longitudinal direction.

15. The method of claim 14, wherein the first motor operates at a first speed in the first stage of the door opening sequence and at a second speed in the second stage of the door opening sequence, the second speed being less than or in a reverse direction from the first speed.

* * * * *